Dec. 7, 1954 C. H. HOEPPNER 2,696,558

PULSE WIDTH DISCRIMINATOR

Filed April 28, 1945 4 Sheets-Sheet 1

PULSE RECEIVING SYSTEM

Inventor

CONRAD H. HOEPPNER

By Ralph L. Chappell

Attorney

Dec. 7, 1954 C. H. HOEPPNER 2,696,558

PULSE WIDTH DISCRIMINATOR

Filed April 28, 1945 4 Sheets-Sheet 2

Inventor

CONRAD H. HOEPPNER

By Ralph L. Chappell

Attorney

Dec. 7, 1954 C. H. HOEPPNER 2,696,558

PULSE WIDTH DISCRIMINATOR

Filed April 28, 1945 4 Sheets-Sheet 3

Inventor
CONRAD H. HOEPPNER

By Ralph L Chappell

Attorney

Inventor
CONRAD H. HOEPPNER
By Ralph L. Chappell
Attorney

United States Patent Office 2,696,558

Patented Dec. 7, 1954

2,696,558

PULSE WIDTH DISCRIMINATOR

Conrad H. Hoeppner, Washington, D. C.

Application April 28, 1945, Serial No. 590,862

5 Claims. (Cl. 250—27)

(Granted under Title 35, U. S. Code (1952), sec. 266)

This invention relates in general to electronic circuits having discriminatory response characteristics and in particular to an electronic circuit for pulse time duration discrimination.

In radio, radar, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, polarity, rate of change, and amplitude.

It is an object of this invention to provide a circuit which is responsive only to potential variations or electrical impulses of a certain time duration and which is unresponsive to potential variations or electrical impulses of all other time durations.

It is another object of this invention to provide a circuit which can be employed between a source of potential variations or electrical impulses and the receiver thereof as an intervening circuit which shields from such receiver all variations or pulses except those having a certain definite preselected time duration.

It is another object of this invention to provide a discrimination circuit the discriminatory action of which is based upon certain definite characteristics of the applied input signal.

Other objects and features of this invention will become apparent upon a careful consideration of the following detailed description when taken together with the accompanying drawings in which.

Figure 2A:
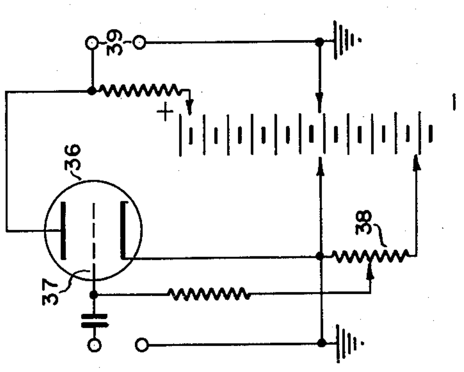
Fig. 2 is a circuit diagram of one embodiment of this invention.
Figure 2:
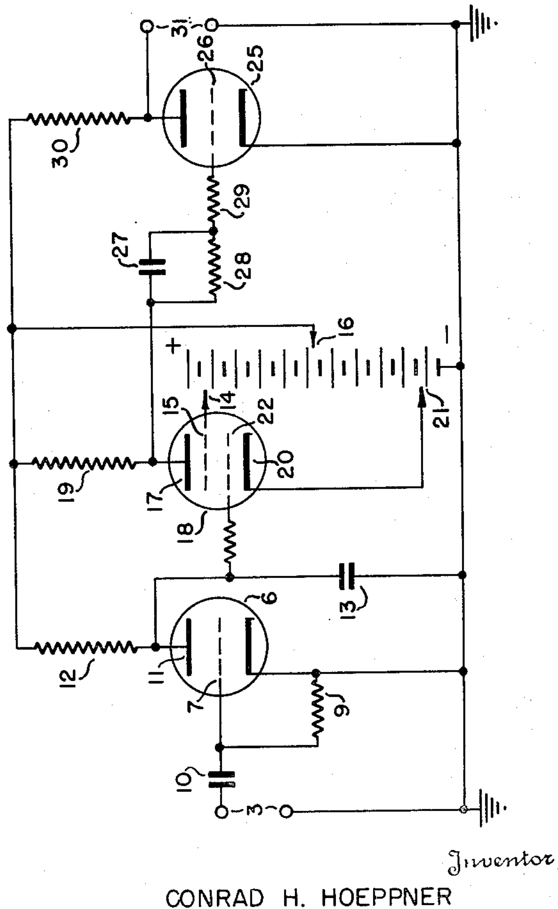
Figure 3:
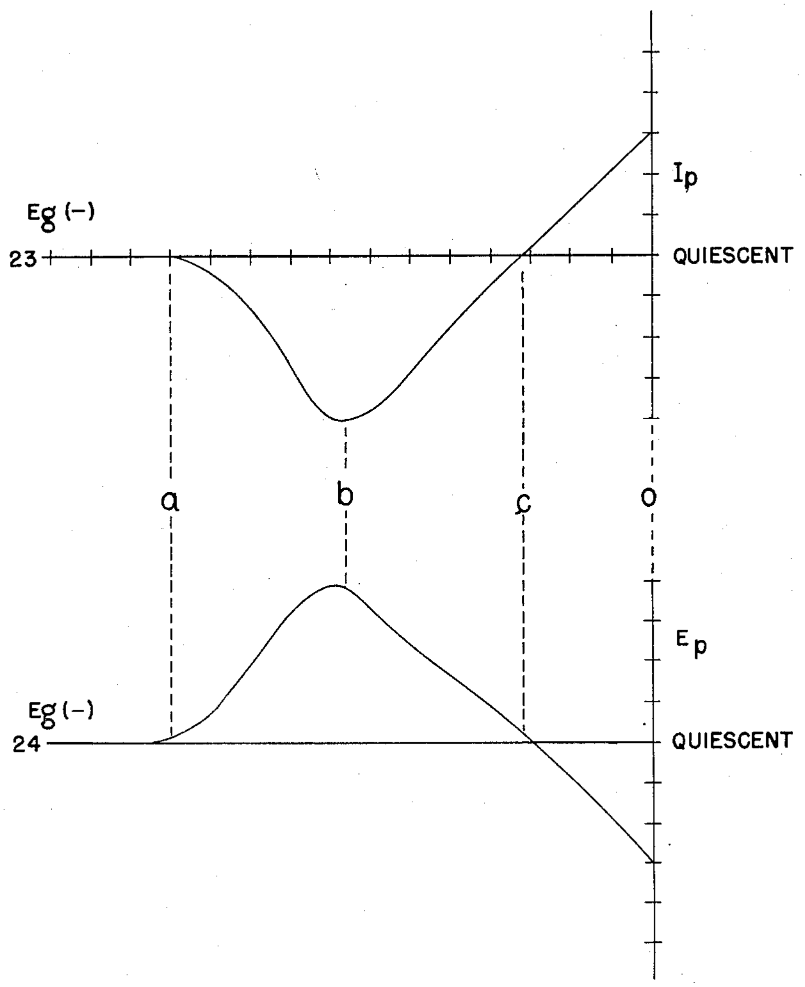
Figure 4:
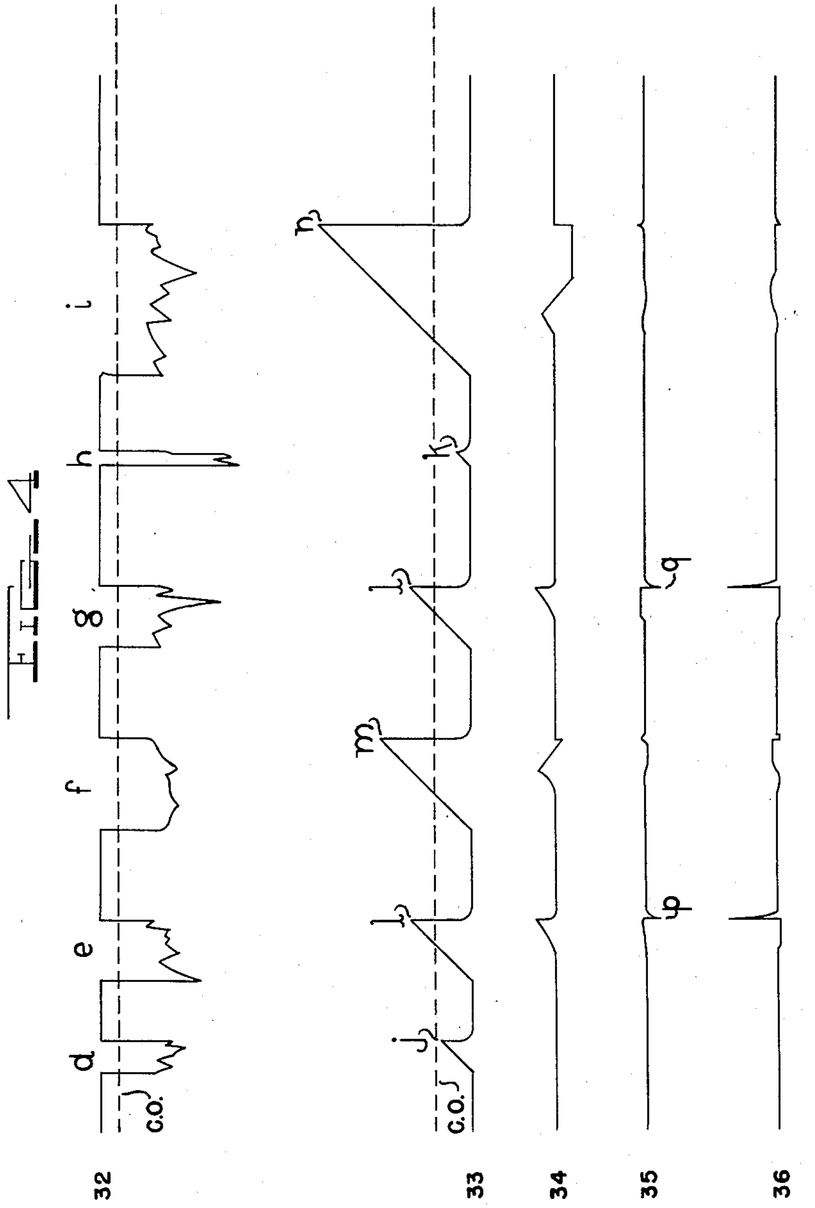
Figure 5:
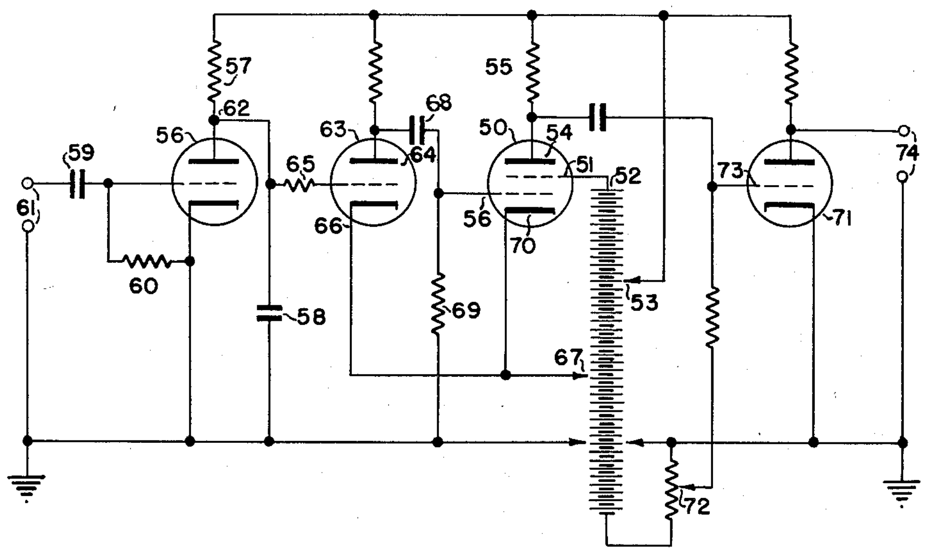

Fig. 2*a* is a circuit diagram of a variation of the embodiment shown in Fig. 2;

Figs. 3 and 4 are series of wave forms which illustrate the operation of the circuit shown in Fig. 2;

Fig. 5 is a circuit diagram of another embodiment of this invention; and

Figure 6:
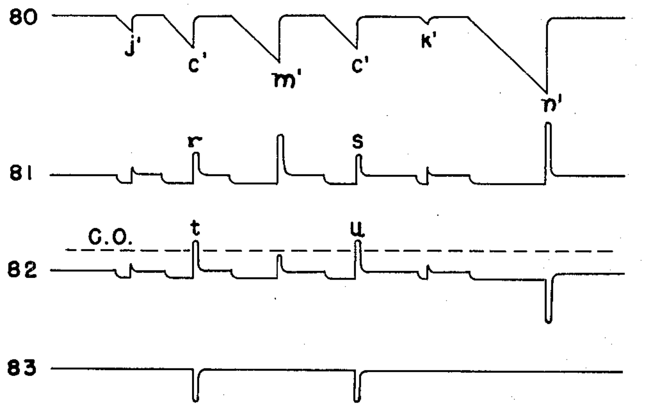

Fig. 6 is a series of wave forms which illustrate the operation of the circuit shown in Fig. 5.

Figure 1:
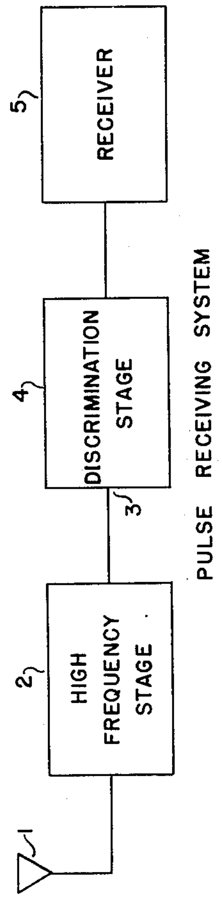
Fig. 1 is a simple block diagram of a pulse receiving system utilizing one embodiment of this invention.

Reference is now had in particular to Fig. 1 wherein there is shown one embodiment of this invention wherein a discrimination circuit is employed to repulse undesired video signals in a pulse receiving system. Pulses or bursts of high frequency energy received by antenna 1, amplified and detected by high frequency stage 2 are impressed, in the form of the envelope of the high frequency pulses of energy to input 3 of discrimination circuit stage 4. Since the pulses of high frequency energy reaching antenna 1 may comprise not only a desired signal but also man-made and fortuitous interfering signals of a frequency which high frequency stage 2 will not reject, and since high frequency stage 2 may itself be a source of interfering signal, it is the function of discrimination stage 4 to shield from receiver 5 all pulses not having the time duration characteristics of the desired signal.

In general, the invention, a preferred embodiment of which is shown in Fig. 2, operates under the influence of the transconductance characteristic of a vacuum tube. In particular this tube, designated by the reference numeral 18 in Fig. 2, is provided with an inflection point in its transconductance characteristic so as to have a negative transconductance region on one side of the inflection point and a positive transconductance region on the other side thereof. In this manner input pulse signals of a certain amplitude can be made to drive the tube to the inflection point and therefore appear at the tube output with a maximum positive amplitude and a sharply defined trailing edge while signals of either greater or lesser amplitude will appear at the tube output with a distinct characteristic which may readily be discriminated against. To drive tube 18 a second vacuum tube 6 is provided. This latter tube is arranged to produce a pulse signal at its output having an amplitude which is directly proportional to the time duration of a signal applied to its input terminals 3. Consequently an input signal, applied to the terminals 3 having the proper time duration can be made to drive tube 18 to the inflection point in its transconductance characteristic while signals of either greater or lesser time duration drive tube 18 either beyond or short of the inflection point as aforementioned and may readily be discriminated against as heretofore described.

In particular, the input terminals 3 represent the point at which voltage variations from high frequency stage 2 of Fig. 1 are applied to the discriminator. The output circuit of high frequency stage 2, not shown, is so constructed that only strong pulse signals of negative polarity and steep leading and trailing edges are applied to input 3. Vacuum tube 6 and associated circuit components represent one form of a saw-tooth pulse generator which, in the absence of signals from high frequency stage 2, is conducting plate current through resistance 12 to ground. Resistance 12 is large as compared to the static plate resistance of tube 6, and grid 7 is returned to ground through resistance 9 so that the potential of anode 11 is substantially ground potential in the quiescent condition. Signals are applied to grid 7 from input 3 via the coupling circuit comprising capacitor 10 and resistance 9. The time constant of this coupling circuit is very long compared to the time duration of any signal applied to input 3 so that capacitor 10 receives very little charge during a pulse. The strong negative pulse signals which are applied to input 3 and communicated to grid 7 have sufficient amplitude to drive grid 7 abruptly below cutoff potential coincident with the leading edge and to return grid 7 abruptly to quiescent condition coincident with the trailing edge. This means that no plate current flows during any pulse signal applied to input 3 and that anode 11 always tends to rise to potential 16, the anode supply potential. Anode 11 is connected through capacitor 13 to ground so that the rate at which anode 11 rises toward potential 16 when a signal is applied to input 3 is governed by the rate at which capacitor 13 receives charge through resistance 12. The time constant of the circuit comprising capacitor 13 and resistor 12 is long compared to the time duration of any pulse applied to input 3 so that the potential at anode 11 increases in a nearly linear manner with respect to time during each pulse, the slope of this rise is uniform for all pulses and the maximum potential reached is practically a linear function of the time duration of the particular pulse.

Four electrode vacuum tube 18 represents any one of several conventional receiving tubes (such as the 6SA7 with all grids except the control grid direct connected together to form the screen grid). Potential 14 to which screen grid 15 is connected is more positive than potential 16 to which anode 17 is connected through resistance 19 thereby creating a negative potential gradient from screen 15 to anode 17. Cathode 20 is connected to a potential 21 above ground such that the potential of grid 22 with tube 6 in its quiescent condition is below cutoff and no space current flows in tube 18. Positive signals reaching grid 22 will permit space current flow in tube 18 consisting of electrons which leave the space charge of cathode 20 and travel toward screen 15 under the accelerating influence of the positive potential gradient from grid 22 to screen 15. The density of the electron stream is controlled almost entirely by variations of grid 22 since screen 15 is held at a fixed positive potential by direct connection to source 14 and acts in the normal manner to shield the cathode space charge from potential variations which may appear at anode 17 by virtue of plate current flow through resistance 19.

The electron stream traveling toward screen 15 is divided into several groups after it passes grid 22. The first of these groups collides directly with the metallic elements of screen 15 and comprises part of the screen grid current. This collision is at a velocity which is sufficient to cause electrons to be emitted from the surface of screen 15, the number of which is determined essentially by the velocity of bombardment and the work function energy of the screen grid surface. All such bombardment emitted electrons from screen 15, which constitute secondary emission from that electrode, are returned thereto since it is the most positive electrode in tube 18. The second of these groups passes through the interstices of screen 15 with insufficient velocity to overcome the negative potential gradient existing from screen 15 to anode 17 and are thus turned back to screen 17 and constitute another part of the screen grid current. The third of these electron groups passes through the interstices of screen 15 with sufficient velocity to continue on to anode 17 and comprise conventional plate current flowing in such a direction through resistance 19 as to reduce the potential of anode 17 if allowed to act independently. This conventional plate current can be termed primary current to distinguish it from the current described below which flows as the result of secondary emission of electrons from anode 17.

The majority of the electrons which reach anode 17 from the space charge of cathode 20 do so with sufficient velocity to dislodge secondary electrons from the surface of anode 17. These dislodged electrons, emitted into a potential gradient which is positive from anode 17 to screen 15, naturally gravitate to screen 15 and supplement the screen grid current. Inasmuch, however, as they move in a direction opposite to that of the electrons which constitute conventional or primary plate current, their flow is such as to increase the potential at anode 17 and they therefore may be termed secondary current. It will be apparent that the potential of anode 17 will be determined by the ratio of primary to secondary current. The potential of anode 17 of tube 18 will be negative with respect to the quiescent or cutoff potential if the ratio is greater than unity and will be positive with respect to quiescent potential if the ratio is less than unity.

In a discrimination circuit constructed according to the teachings of this invention, as shown in one form in Fig. 2 and employing one of several common receiving type multi-electrode vacuum tubes as tube 18, the secondary current will exceed the primary current and thus give a ratio less than unity and a positive swing of anode 17 over a range extending from a virtually nonconducting condition of tube 18 up to a density of space current electron flow which so alters the potential gradient between screen 15 and anode 17 that enough of the secondary electrons emitted from anode 17 are returned to anode 17 to permit the proportion of primary current to secondary current to assume a value of unity or greater. This means that positive potentials, above a certain predetermined amplitude controllable by potentials 14 and 16, impressed upon grid 22 cause the potential of anode 17 to move in a positive direction. If the positive potential applied to grid 22 exceeds the upper limit controllable by said potentials 14 and 16, primary exceeds secondary current and the potential of anode 17 moves in a negative direction from its quiescent value.

In wave form 23 of Fig. 3, net plate current ($I_p$) has been plotted as the vertical coordinate against the potential of grid 22 ($E_g$) on the horizontal axis and is representative of the transconductance characteristic of tube 18. At grid potential *a* and below space current flow is negligible and net plate current flow is likewise negligible. In the grid potential, range from *a* to *b* the transconductance characteristic is negative and from the inflection point *b* on, the transconductance characteristic is positive. As an example, a screen voltage 14 of +300 volts and a plate potential 16 of +100 volts were used to obtain a transconductance characteristic of this type. In this connection it may be well to note that the steepness of the negative region of the transconductance characteristic and the curvature of the inflection point *b* may be either increased or decreased by increasing or decreasing respectively the voltage gradient between the screen 15 and the plate 17.

In wave form 24 of Fig. 3 the corresponding variation of anode 17 potential ($E_p$) with variations in grid 22 potential, ($E_g$) has been plotted.

In Fig. 2, vacuum tube 25 and associated circuit components comprise one form of a conventional amplifying circuit connected so that potential variations appearing at anode 17 of tube 18 are communicated to grid 26 of tube 25 via capacitor 27 and resistances 28 and 29. When tube 18 is biased off (in its quiescent condition) anode 17 is essentially at potential 16 and grid 26 is essentially at ground potential by virtue of grid current flow through resistances 28 and 29. In selecting resistances 28 and 29 resistor 28 should be made large compared to resistance 29 and the latter large compared to the static grid resistance of tube 25. Since resistance 28 is large compared to either resistance 29 or the static grid resistance of tube 25 the greatest part of the potential drop from anode 17 to ground in the quiescent state appears across resistance 28 and hence across capacitor 27. Capacitor 27 is, therefore, charged during the quiescent condition. The low resistance in the charge path of capacitor 27, consisting of resistance 29 and the static grid resistance of tube 25, permits rapid charging of capacitor 27. Resistance 29 causes grid limiting and therefore permits little change in potential of grid 26 during any positive excursion of anode 17 either gradual or abrupt. The resistance in the discharge path of capacitor 27 consisting of large resistance 28 is so fixed in value with respect to the capacity of capacitor 27 that capacitor 27 discharges rapidly with respect to any gradual negative excursion of anode 17 but loses little of its charge during any abrupt negative change in potential of anode 17. This means that for any gradual negative change in potential at anode 17 only small potential variations appear at grid 26. An abrupt negative change in potential at anode 17, however, is communicated through capacitor 27 to the grid 26 to reduce the flow of plate current through tube 25 and resistance 30 thus causing a sharp positive signal to appear at output 31. It may thus be said that the combination of capacitance 27, resistances 28 and 29 and tube 25 function as a wave responsive device which produces an output signal only when the input signal applied thereto is a predetermined shape.

In Fig. 4, the voltage variations with respect to time at various selected points in the circuit of Fig. 2 have been plotted as a series of wave forms in order to illustrate how the circuit favors input signals of a certain preselected duration and discriminates against all other, either of less or greater time duration.

Wave form 32 is representative of a series of negative pulses applied at input terminals 3 by high frequency stage 2 of Fig. 1. Pulses *e* and *g* represent elements of a signal by means of which intelligence is conveyed. They have a definite predetermined time duration fixed by the remote source from which the antenna of the system is designed to receive energy. They are, therefore, desired pulses and the ones to be favored by the discrimination circuit. Pulses *d*, *f*, *h* and *i* are interfering signals having random time duration, carrying no intelligence, and may result from atmospheric disturbance or man-made interfering radiation. As hereinbefore described, all these pulses have sufficient amplitude to drive grid 7 below cutoff potential indicated by line C. O. superposed on wave form 32. Insofar as the effect of amplitude only is concerned, therefore, all of the pulses are uniform and the variation appears only in their respective time durations.

Wave form 33 illustrates the practically linear increase of potential at anode 11 during each of the pulses and is representative of the charging rate of capacitor 13 when tube 6 is cut off. It will be seen that the short time durations of pulses *d* and *h* allow capacitor 13 to charge very little as indicated by the low amplitudes *j* and *k*. The time duration of the desired pulses *e* and *g* is such that capacitor 13 charges up to amplitude *l* and the time durations of pulses *f* and *i* are greater so that capacitor 13 charges up to amplitudes *m* and *n*. Since these variations in potential are applied to grid 22 of tube 18, the cutoff potential line C. O. for this tube has been superposed on wave form 33. Wave form 34 illustrates the potential variations at anode 17 of tube 18 during the corresponding grid 22 variations. Grid 22 variations of amplitude *j* and *k* are too weak to overcome the bias voltage 21 and thus to cause tube 18 to conduct and no signal appears at anode 17. Grid 22 variations of amplitude *l* drive tube 18 into the negative transconductance region, or *a* to *b* in wave form 23 of Fig. 3, to force plate current flow in such a direction that the potential of anode 17 moves in a positive direction then drops abruptly back to quiescent condition. Grid 22 variations of amplitude *m* and *n* force plate current flow progressively through the negative transconductance region *a* to *b* where plate current flow is in such a direction as to make anode 17 positive and on into the positive transconductance region *b* to *o* where the direction of plate current flow is such as to render anode 17 negative with respect to quiescent potential. At the end of the variations caused by pulses *f* and *i*, anode 17 moves abruptly positive to quiescent condition. The resulting variations in plate potential for tube 18 is shown by wave form 34. From this wave form may be seen that tube 18 functions essentially as an amplitude responsive device adapted to produce an output signal whose wave shape is dependent upon the amplitude of the input signal applied thereto.

Wave form 35 illustrates the corresponding variations of grid 26 of tube 25. As hereinbefore described only abrupt negative excursions of potential at anode 17 cause any appreciable variation of grid 26 as at *p* and *q*. These particular variations correspond to the trailing edges of the desired pulses *e* and *g* and cause the potential at output 31 to take the shape of wave form 36. Thus does the discrimination circuit shown in Fig. 2 favor desired pulses *e* and *g* of a definite predetermined time duration and discriminate against pulses such as *d*, *f*, *h* and *i* of random time duration. Obviously, since the potential range *a* to *b* of wave form 23 in Fig. 3 has a finite value, there will be a finite range of pulse durations which will cause an abrupt negative movement of anode 17 and thus cause positive signals to appear at output 31. To those well versed in the art, the problem of reducing this finite range of pulses which can cause an effective discrimination circuit output is simply a matter of adding an amplitude responsive device at output 31.

Such an arrangement is illustrated by Fig. 2*a* in which tube 36 is the vacuum tube component of an amplitude responsive amplifier. The potential of grid 37 in the quiescent condition is so established by potentiometer 38 that only those pulses applied to input 3 which have a duration of the proper order to cause maximum positive excursion of the potential of anode 17 unbias tube 36 and cause any output signal at output terminals 39. This action is made to occur by adjustment of potential 21 so that pulses of the desired duration and consequently amplitude are just sufficient to drive tube 18 to the inflection point *b* in the transconductance characteristic of the tube.

A variant embodiment of this invention which likewise operates under the influence of the transconductance characteristic of a vacuum tube but which has a different overall circuit arrangement is shown in Fig. 5. In particular, tube 50 of Fig. 5 is provided with an inflection point in its transconductance characteristic essentially by virtue of the connection of screen grid 51 to a potential more positive than that from which plate 54 is supplied. The action of tube 50 is substantially the same as the action of tube 18 of Fig. 2 hereinbefore described but the signals impressed upon its control grid 56 cause signals to appear at plate 54 which differ primarily in amplitude and only incidentally in shape in a manner which is described in the following paragraphs.

The first stage of the circuit of Fig. 5, of which tube 56 is the vacuum tube component, represents a saw-tooth generator which functions in the same manner as the first stage of the circuit of Fig. 2. A negative pulse applied at input terminals 61 causes the potential of plate 62 to rise in a nearly linear manner for the duration of such pulse and to drop abruptly back to quiescent potential coincident with its trailing edge. Thus there appears at plate 62 a positive going triangular pulse which has a steep trailing edge and which has an amplitude which is a function of the time duration of the negative pulse applied at input 61.

The purpose of the second stage of Fig. 5, of which tube 63 is the vacuum tube component, is to invert, by conventional amplifier action, the positive going triangular pulses produced by the first stage. The negative going triangular pulses which appear at plate 63 as the result of such inversion are applied, through a low time constant circuit to vacuum tube 50. This circuit, comprising capacitor 68 and resistance 69 acts as a peaker or differentiator. Its action is such as to permit only a small variation of the potential at grid 56 during the linear decrease in potential at plate 64 of tube 63 and to cause a sharp positive signal of short time duration coincident with the abrupt positive going return of plate 64 to its quiescent condition. The amplitude of such sharp positive signal at grid 56 is a function of the time duration of the negative pulse at input 61 since it is this duration which determines the maximum potential excursion of plate 62 of tube 56 and hence of plate 64 of tube 63.

Tube 50 is normally non-conducting by virtue of the connection of cathode 70 to a positive potential 67 above ground. By suitable selection of potential 67, only those negative pulses applied to terminals 61 which have the proper time duration will produce the positive pulse amplitude at grid 56 required to drive tube 50 to the inflection point of its transconductance characteristic. An input pulse of too short a time duration will cause tube 50 to be driven short of the inflection point while an input pulse of too long a time duration will cause tube 50 to be driven beyond. Since tube 50 must be driven to, but not beyond, its point of inflection in order to secure a maximum excursion of potential of plate 54, a final stage responsive only to such maximum excursion will provide the final act of pulse width discrimination. Such a final stage is represented by tube 71 which, in the absence of an applied signal, is held below cutoff by biasing potentiometer 72 and functions in the same manner as the circuit of Fig. 2*a* previously described.

Let it be assumed that the series of negative pulses represented by wave form 32 of Fig. 4 is applied to input 61. Here again pulses *e* and *g* are the only ones which represent useful signals while pulses *d*, *f*, *h* and *i* are random useless signals. Wave form 33 of Fig. 4 depicts the triangular positive pulses which appear at plate 62 of tube 56 in response to such a series of input pulses. After inversion by tube 63, the triangular pulses are as shown by wave form 80 of Fig. 6 to which reference is now had. The action of the peaker circuit between tubes 63 and 50 upon the pulses of wave form 80 with respect to grid 56 is shown in wave form 81. It will be seen from this that the amplitude of a positive pulse appearing at grid 56 is a function of the time duration of the pulse applied to input 61. In the circuit of Fig. 5, potential 67 has been so selected that the amplitude of positive pulses *r* and *s*, corresponding to useful input pulses *e* and *g*, is just sufficient to drive tube 50 to the point of inflection in its transconductance characteristic. This determines, as shown by wave form 82, that pulses *r* and *s* cause the maximum possible excursions *t* and *u* of plate 54, while the random signals cause either smaller positive excursions or overdrive tube 50 so far that plate 54 goes negative. Superposed on wave form 82 is line C. O. which indicates the potential to which plate 54 must rise before tube 71 is unbiased. Since only pulses *t* and *u* rise above C. O., only these pulses will cause tube 71 to conduct and produce signals at output 74 as shown by wave form 83.

Thus the embodiment illustrated by the circuit of Fig. 5 has acted to discriminate against and block input signals *d*, *f*, *h* and *i* of random time duration and to favor and pass useful signals *e* and *g* of predetermined time duration.

It will be apparent that a time duration or pulse width discrimination circuit constructed in accordance with the teachings of this invention will have a wide variety of applications in radio, radar, television, and other electronic fields whenever discrimination between voltage variations is desirable and the time duration of such variations can be used as the basis for such discrimination. It will also be apparent that a pulse width discrimination circuit constructed in accordance with the teachings of this invention may be used in combination with other circuits, also discriminatory in response, whose action is based on other characteristics of the input signal such as amplitude, polarity, or rate of change.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A means of pulse width discrimination, comprising means producing a voltage pulse whose amplitude is proportional to the time duration of the input signals applied thereto, an amplitude responsive means including a vacuum tube arranged to receive the output from said first named means, voltage means providing said tube with an inflection point in its transconductance characteristic, said inflection point bounded by a negative transconductance region on one side thereof and a positive transconductance region on the other side thereof, means biasing said tube so that the output voltage wave it produces has a shape dependent upon the amplitude of the output wave from said first named means, and a voltage wave responsive means arranged to operate from the output of said tube and adapted to produce an output signal only when the output wave from said tube is of a predetermined shape, said wave responsive device including a vacuum tube having at least one control grid, a series resistance and a parallel connection of resistance and capacitance connecting the control grid of said last named tube to the output from said first named tube.

2. A pulse width discriminator, comprising means converting incoming signal pulses of varying widths into signal pulses of varying amplitudes, each of the latter signal pulses having an amplitude proportional to the width of the incoming signal producing the same, a vacuum tube amplifier having anode, cathode and grid electrodes with the grid electrode connected to receive said signal pulses of varying amplitude, means for producing an inflection point in the transconductance characteristic of said tube, said inflection point being bounded on one side by a negative transconductance region and on the other side by a positive transconductance region, means biasing the grid of said tube for operation on one side of said inflection point, whereby those signals of varying amplitudes which drive said tube up to but not beyond the inflection point in the transconductance characteristic appear at the anode of said tube with a substantially unaltered wave shape while those signals of varying amplitudes which drive said tube beyond the inflection point in its transconductance characteristic appear at the anode of said tube with an altered wave shape, and signal translator means coupled to the anode of said tube for repeating only those signal pulses of substantially unaltered wave shape.

3. A pulse width discriminator, comprising means converting incoming signal pulses of varying widths into signal pulses of varying amplitudes, each of the latter signal pulses having an amplitude proportional to the width of the incoming signal producing the same, a vacuum tube amplifier having anode, cathode and grid electrodes with the grid electrode connected to receive said signal pulses of varying amplitude, a source of operating potential connected between the electrodes of said tube operative to produce an inflection point in the transconductance characteristic of said tube, said inflection point being bounded on one side by a negative transconductance region and on the other side by a positive transconductance region, means biasing the grid of said tube for operation on one side of said inflection point, whereby those signals of varying amplitudes which drive said tube up to but not beyond the inflection point in the transconductance characteristic appear at the anode of said tube with a substantially unaltered wave shape while those signals of varying amplitudes which drive said tube beyond the inflection point in its transconductance characteristic appear at the anode of said tube with an altered wave shape, and signal translator means coupled to the anode of said tube for repeating only those signal pulses of substantially unaltered wave shape.

4. A pulse width discriminator, comprising means converting incoming signal pulses of varying widths into signal pulses of varying amplitudes, each of the latter signal pulses having an amplitude proportional to the width of the incoming signal producing the same, a vacuum tube amplifier having anode, cathode and grid electrodes with the grid electrode connected to receive said signal pulses of varying amplitude, means for producing an inflection point in the transconductance characteristic of said tube, said inflection point bounded on one side by a negative transconductance region and on the other side by a positive transconductance region, means biasing the grid of said tube beyond cut-off whereby only those signals of varying amplitudes which exceed the cut-off bias can produce an output signal from said amplifier and whereby those signals of varying amplitudes which drive said tube up to but not beyond the inflection point in the transconductance characteristic appear at the anode of said tube with a substantially unaltered wave shape while those signals of varying amplitudes which drive said tube beyond the inflection point in its transconductance characteristic appear at the anode of said tube with an altered wave shape, and signal translator means coupled to the anode of said tube for repeating only those signal pulses of substantially unaltered wave shape.

5. A pulse width discriminator, comprising means covering incoming signal pulses of varying widths into signal pulses of varying amplitudes, each of the latter signal pulses having an amplitude proportional to the width of the incoming signal producing the same, a vacuum tube amplifier having anode, cathode and grid electrodes with the grid electrode connected to receive said signal pulses of varying amplitude, means including a source of operating potential connected between the electrodes of said tube operative to produce an inflection point in the transconductance characteristic of said tube, said inflection point being bounded on one side by a negative transconductance region and on the other side by a positive transconductance region, means biasing the grid of said tube beyond cut-off whereby only those signals of varying amplitudes which exceed the cut-off bias can produce an output signal from said amplifier and whereby those signals of varying amplitudes which drive said tube up to but not beyond the inflection point in the transconductance characteristic appear at the anode of said tube with a substantially unaltered wave shape while those signals of varying amplitudes which drive said tube beyond the inflection point in its transconductance characteristic appear at the anode of said tube with an altered wave shape, and signal translator means coupled to the anode of said tube for repeating only those signal pulses of substantially unaltered wave shape.

References Cited in the file of this patent

UNITED STATES PATENTS

| Number | Name | Date |
|---|---|---|
| 2,141,673 | Thompson | Dec. 27, 1938 |
| 2,190,292 | Landon | Feb. 13, 1940 |
| 2,193,578 | Bruce | Mar. 12, 1940 |
| 2,230,243 | Haffcke | Feb. 4, 1941 |
| 2,275,930 | Torcheux | Mar. 10, 1941 |
| 2,266,401 | Reeves | Dec. 16, 1941 |
| 2,359,447 | Seeley | Oct. 3, 1944 |
| 2,520,932 | Hoeppner | Sept. 5, 1950 |